United States Patent
Okawa et al.

(10) Patent No.: US 11,527,990 B2
(45) Date of Patent: Dec. 13, 2022

(54) AGGREGATED PHOTOVOLTAIC PANELS

(71) Applicant: SunPower Corporation, San Jose, CA (US)

(72) Inventors: David C. Okawa, Redwood City, CA (US); Zachary S. Judkins, Oakland, CA (US); Tamir Lance, Los Gatos, CA (US); Tyler D. Newman, San Jose, CA (US); Thierry H. Nguyen, San Francisco, CA (US); Ryan Reagan, Hayward, CA (US)

(73) Assignee: SunPower Corporation, San Jose, CA (US)

( * ) Notice: Subject to any disclaimer, the term of this patent is extended or adjusted under 35 U.S.C. 154(b) by 4 days.

(21) Appl. No.: 16/789,013

(22) Filed: Feb. 12, 2020

(65) Prior Publication Data

US 2020/0266759 A1    Aug. 20, 2020

Related U.S. Application Data

(60) Provisional application No. 62/808,168, filed on Feb. 20, 2019.

(51) Int. Cl.
*H02S 20/22* (2014.01)
*H02S 40/36* (2014.01)
*H02S 20/25* (2014.01)
*H02S 40/34* (2014.01)
*H01R 12/58* (2011.01)

(52) U.S. Cl.
CPC ........... *H02S 40/36* (2014.12); *H01R 12/585* (2013.01); *H02S 20/25* (2014.12); *H02S 40/34* (2014.12)

(58) Field of Classification Search
CPC ....... H01L 31/00–078; Y02E 10/50–60; H02S 20/00–32; H02S 30/00–20
USPC .................................................. 136/243–265
See application file for complete search history.

(56) References Cited

U.S. PATENT DOCUMENTS

| 4,537,838 A | 8/1985 | Jetter et al. |
| 2002/0043031 A1* | 4/2002 | Eguchi ..................... H02S 20/23 52/173.3 |
| 2002/0129849 A1* | 9/2002 | Heckeroth ................ E04D 5/00 52/173.3 |
| 2003/0070368 A1 | 4/2003 | Shingleton |
| 2003/0154666 A1 | 8/2003 | Dinwoodie |
| 2003/0154680 A1 | 8/2003 | Dinwoodie |
| 2004/0144043 A1* | 7/2004 | Stevenson ............... H02S 20/23 52/173.3 |
| 2005/0014470 A1 | 1/2005 | Malladi |

(Continued)

FOREIGN PATENT DOCUMENTS

| CN | 105895710 | 8/2016 |
| EP | 2395555 A2 | 12/2011 |
| EP | 2395555 A3 | 10/2015 |

OTHER PUBLICATIONS

European Search Report, EP Application EP20158191, dated May 29, 2020.

*Primary Examiner* — Bach T Dinh
(74) *Attorney, Agent, or Firm* — Grasso PLLC

(57) ABSTRACT

Photovoltaic panels may be aggregated in various ways and may be aggregated with the use of a backplane where the backplane comprises electrical connectors positioned to electrically connect the PV panels. The PV panels may have various sizes and shapes and may overlap one or more other PV panels or PV panels being aggregated.

9 Claims, 12 Drawing Sheets

(56) References Cited

U.S. PATENT DOCUMENTS

| | | |
|---|---|---|
| 2006/0000178 A1 | 1/2006 | Almy |
| 2006/0266405 A1 | 11/2006 | Lenox |
| 2007/0074755 A1* | 4/2007 | Eberspacher ..... H01L 31/02008 136/244 |
| 2010/0068924 A1* | 3/2010 | Nightingale ............ H02S 20/25 439/544 |
| 2010/0236165 A1* | 9/2010 | Smith ..................... F24S 25/61 52/173.3 |
| 2010/0236603 A1 | 9/2010 | Menard et al. |
| 2011/0185652 A1 | 8/2011 | Lenox |
| 2013/0019922 A1 | 1/2013 | Lenox |
| 2016/0079911 A1 | 3/2016 | Rose et al. |
| 2016/0276508 A1* | 9/2016 | Huang ................... H02S 30/20 |
| 2017/0117846 A1 | 4/2017 | Huang |
| 2019/0074795 A1 | 3/2019 | Ehlmann et al. |
| 2019/0312159 A1 | 10/2019 | Judkins et al. |

* cited by examiner

AGGREGATED PHOTOVOLTAIC PANELS

CROSS-REFERENCE TO RELATED APPLICATION

This application claims priority to U.S. provisional patent application 62/808,168, which was filed on Feb. 20, 2019, and is entitled Aggregated Photovoltaic Panels. The '168 application is incorporated herein, in its entirety, by reference.

TECHNICAL FIELD

Systems, processes, articles of manufacture, and apparatus directed to photovoltaic panel connection are provided herein. More particularly, systems, processes, articles of manufacture, and apparatus directed to backplanes configured to connect one or more photovoltaic panels are provided herein.

BACKGROUND

Photovoltaic (PV) cells, commonly known as solar cells, are devices for conversion of solar radiation into electrical energy. Generally, solar radiation impinging on the surface of, and entering into, the substrate of a solar cell creates electron and hole pairs in the bulk of the substrate. The electron and hole pairs migrate to p-doped and n-doped regions in the substrate, thereby creating a voltage differential between the doped regions. The doped regions are connected to the conductive regions on the solar cell to direct an electrical current from the cell to an external circuit. When PV cells are combined in an array such as a PV module, the electrical energy collected from all of the PV cells can be combined in series and parallel arrangements to provide power with a certain voltage and current.

Photovoltaic modules regularly contain a border frame, one or more photovoltaic panels, and support electronics. PV modules are often mounted in groupings on a roof or other support structure. Their output is often aggregated and provided to a local load or the power grid. Installation of these groupings can be time consuming and labor intensive, requiring many in-field soldered electrical connections, which are subject to error during installation, and deterioration over time.

DETAILED DESCRIPTION

Figure 1A:
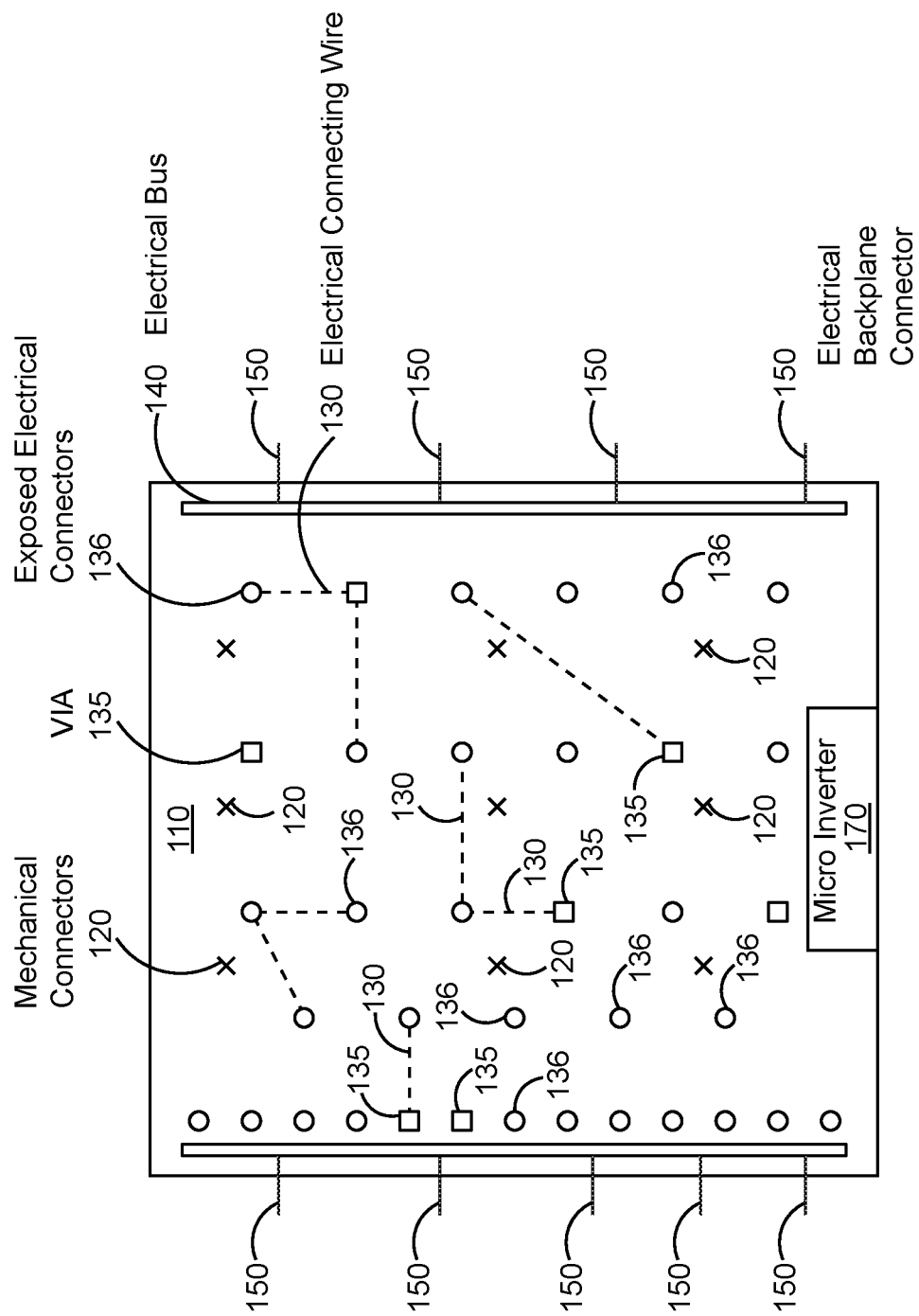
FIG. 1A illustrates a plan view of a backplane, as may be employed according to some embodiments.

The following detailed description is merely illustrative in nature and is not intended to limit the embodiments of the subject matter of the application or uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Terminology. The following paragraphs provide definitions and/or context for terms found in this disclosure (including the appended claims):

"Comprising." This term is open-ended. As used in the appended claims, this term does not foreclose additional structure or steps.

"Configured To." Various units or components may be described or claimed as "configured to" perform a task or tasks. In such contexts, "configured to" is used to connote structure by indicating that the units/components include structure that performs those task or tasks during operation. As such, the unit/component can be said to be configured to perform the task even when the specified unit/component is not currently operational (e.g., is not on/active). Reciting that a unit/circuit/component is "configured to" perform one or more tasks is expressly intended not to invoke 35 U.S.C. § 112(f) for that unit/component.

"First," "Second," etc. As used herein, these terms are used as labels for nouns that they precede, and do not imply any type of ordering (e.g., spatial, temporal, logical, etc.). For example, reference to a "first" PV tile does not necessarily imply that this PV tile is the first PV tile in a sequence; instead the term "first" is used to differentiate this PV tile from another PV tile (e.g., a "second" PV tile).

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

"Coupled"—The following description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically.

"Inhibit"—As used herein, inhibit is used to describe a reducing or minimizing effect. When a component or feature is described as inhibiting an action, motion, or condition it may completely prevent the result or outcome or future state completely. Additionally, "inhibit" can also refer to a reduction or lessening of the outcome, performance, and/or effect which might otherwise occur. Accordingly, when a component, element, or feature is referred to as inhibiting a result or state, it need not completely prevent or eliminate the result or state.

In addition, certain terminology may also be used in the following description for the purpose of reference only, and thus are not intended to be limiting. For example, terms such as "upper", "lower", "above", and "below" refer to directions in the drawings to which reference is made. Terms such as "front", "back", "rear", "side", "outboard", and "inboard" describe the orientation and/or location of portions of the component within a consistent but arbitrary frame of reference which is made clear by reference to the text and the associated drawings describing the component under discussion. Such terminology may include the words specifically mentioned above, derivatives thereof, and words of similar import.

In the following description, numerous specific details are set forth, such as specific operations and features, in order to provide a thorough understanding of embodiments of the present disclosure. It will be apparent to one skilled in the art that embodiments of the present disclosure may be practiced without these specific details. In other instances, well-known techniques are not described in detail in order to not unnecessarily obscure embodiments of the present disclosure.

Embodiments are described herein where photovoltaic (PV) panels of similar or different sizes, such as a full PV panel, PV subpanels, PV half-panels, PV three-quarter-panels, PV micro-panels, are electrically connected together to form a larger PV panel. This PV panel, whether a PV panel, PV subpanel, PV half-panel, PV three-quarter-panel, or PV micro-panel, may itself be electrically connected to other PV panels in order to aggregate outputs. The PV panels, whether they are sub-panels or full panels or other configurations, may each be mechanically connected so as to be shingled relative to an upper or lower panel. In other words, an edge or portion of a PV panel, whether a sub-panel or a larger panel or other configuration, may overlay an edge or portion of another PV panel and, likewise, an edge or portion of a PV panel may overlay another edge or portion of a PV panel.

When PV panel is used herein, for brevity, this may refer to full PV panels, PV subpanels, PV half-panels, PV three-quarter-panels, or PV micro-panels. These PV panels may comprise one or more PV cells. These PV panels may be mounted on a backplane and this backplane may include electrical connections, such as traces, wires, buses, cables, etc. used to electrically connect PV panels. The backplane may be rigid and may be a composite, such as a laminate, as well as a homogenous material. The backplane may comprise mechanical connectors, the mechanical connectors sometimes configured to hold and/or align backplanes together, the mechanical connectors sometimes configured to hold and/or align a backplane to a PV panel and/or an aggregate of PV panels. The mechanical connectors may comprise various configurations including snap-fit type connectors, friction-only type connectors, male-female connectors, and hook and loop connectors. The mechanical connectors may create fixed connections and moveable connections, where the connected parts may be adjusted relative to each other after being connected. The connections may be permanent and may be repositionable.

As noted above, PV panels, as used herein may be any of full PV panels, PV subpanels, PV half-panels, PV three-quarter-panels, and/or PV micro-panels. These PV panels may comprise a PV cell and a substrate to mount the PV cell on. The PV panel may further comprise electrical pathways, such as ribbon traces, to electrically connect with other PV panels or other components. The substrate may be flexible or rigid and may comprise polymers, ceramics, metals, other materials, and combinations thereof.

In embodiments, dummy panels may also be employed. These dummy panels may be placed in areas not occupied by a PV panel and may also be employed to assist in mounting the various PV assemblies disclosed herein. This mounting assistance may serve as flashing, cover electrical connections, and serve as mechanical connections for PV panels that are spaced apart from each other. The mounting assistance may provide other purposes as well. The dummy panels may appear to be PV panels from a distance, as to provide visual continuity from a distance.

One or more backplanes may be employed in embodiments. Such backplanes may serve as mechanical connectors and electrical connectors to PV panels mated to the backplane. Thus, backplanes may comprise mechanical connectors to hold backplanes together and mechanical connectors to hold PV panels or PV panels to the backplane. The backplanes may also comprise electrical connectors that provide electrical connection points for a PV panel or PV panel and electrical connection paths, such as traces or other wires between PV panels or PV panels electrically connected to the backplane. The backplane may further comprise electrical connectors to electrically connect backplanes to one another and electrical busses to aggregate currents or voltages from PV panels, PV panels, microinverters, or other components electrically connected by the backplane.

Thus, in embodiments, aggregated PV systems may be created by combining several PV panels with a backplane and supporting electronics, and mounting the combined system on a support structure for final use. Several of these backplanes, PV panels, and supporting electronics may be aggregated together to form assemblies and an even larger PV array system. In some embodiments, supporting electronics may be mounted on some, all, or none of the backplanes. The combined backplane and one or more PV panel, once attached, now considered a PV assembly, can serve as an installation PV module of a larger design for an entire PV array system.

By attaching the PV panel to a backplane, both mechanically and electrically, panels may be aggregated in a manor tailored to the particular geometry or power demands of a specific PV installation site. In other words, in a parallelogram shaped installation, rectangular PV panels may be mounted in an offset fashion on a rectangular backplane in order to better mimic the parallel geometry of a specific site. Similarly, a triangular backplane may be used with rectangular PV panels to closely mimic a triangular support structure with the PV panels overhanging the edge of the backplane and being staggered as well. Thus, through a flexible geometry of backplane geometry and flexible placement and overlap of PV panels mounted to the backplane, installed backplane and PV panel systems can be tailored to mimic non-square support structure installation geometries. Likewise, voltage or current demands may be better met by aggregating PV panels of different sizes in order to reach a target voltage or current output. For example, a voltage target of 240 volts may be met by aggregating 160 PV panels of 1.5V each as well as nine 6V PV panels with sixty-two 3V PV panels. Likewise, a voltage target of 375 volts may be met by aggregating 250 1.5V PV panels as well as sixty-two 6V PV panels and two 1.5V PV panels. Numerous other combinations of 1.5V, 3V (i.e., 2*V), and 6V (i.e., 4*V), as well as other PV panel voltages, may be aggregated as well to provide different target electrical outputs.

The electrical connections between PV panels mounted on a backplane may be made through the backplane, in wires, such as ribbons or other traces, or other types of embedded electrical pathways of the backplane. The electrical connection may also be made with jumpers or other electrical pathways outside of the backplane and with combinations of embedded and nonembedded electrical pathways. Electrical pathways between backplanes, e.g., electrical backplane connectors, may be provided with ribbons, wires, or other electrical connections spanning electrically connected backplanes.

In embodiments, the electrical pathways embedded in a backplane may be accessible through vias in the surface of a backplane as well as through surface mounted contact points. The electrical pathways may be adjustable in a backplane and may be fixed as well. In some embodiments, the electrical connections, electrical connection points, mechanical connections, and mechanical connection points may be preset ahead of installation for a specific number and/or orientation of PV panels mounted on the backplane.

In embodiments, a backplane may have one or more planar or generally planar surface. A top planar surface may be configured to receive multiple PV panels while a bottom planar surface may be configured to attach to support structures. Top planar surfaces may be flat or may have terrain as well. In some embodiments, the terrain may be stagger-stepped such that PV panels may be mounted in a shingled fashion on the top surface of the backplane. Likewise, a generally planar bottom surface may have flat sections and other sections with terrain, whereby attachment points of a support structure can be secured.

Embodiments may be assembled away from the installation site as well as at the installation site. This assembly can include gathering several panels of the same or different number of PV cells and electrically connecting them with solderable ribbons or other electrical connections. These ribbons or other connections may be laminated or sealed with butyl tape or RTV or another sealing material to a backplane. In certain embodiments, as noted above, the backplane itself may have ribbons, electrical bussing or other electrical connectors already integrated (e.g., as a manufactured laminate). In certain embodiments, the panels, whether PV or dummy, may comprise connector flaps (e.g., folding flaps) that come down on top of a solder area or the subsequent panel could be used to cover the soldered area.

If laminated, a thermoplastic encapsulant may itself be employed as a laminate to the back of an initial or subsequent panel assembly. Flowable encapsulants may be reflowed and serve as a seal upon a second lamination cycle.

The aggregated backplanes and PV panels, now a group of PV assemblies, may be mounted on the support structure and may be further connected to more PV assemblies, as well as support electronics and cabling, to form an entire PV array system. Thus, in embodiments, a modular system, to meet specific site configurations of size, shape, power, etc, may be accommodated by different PV combinations of PV panels and backplanes (i.e., PV assemblies). These different combinations of PV panels and backplanes, i.e., PV assemblies, having different overall shapes and different overall power specifications may be further combined with other assemblies and may be part of an entire PV array system.

In embodiments, PV panels and backplanes may be aggregated with or without a junction box and/or other support circuitry or cabling. Assembly may be automated with panel and panel orientations and electrical interconnections oriented and positioned in ways that avoid controlled conductors (and thus applicable module level shutdown code requirements). Electrical connections may comprise ribbons that are soldered to the backplane and sealed with appropriate sealing material (butyl glue, silicone RTV, or laminating thermoplastic or thermoset material). For example, a flexible laminate area that covers the ribbons but allows for soldering and sealing around the ribbons may be employed. Embodiments may also comprise electrical ribbons that are attached to simple connectors, such as spade connectors, that can be plugged directly into wires of a backplane.

Assembly of embodiments may employ controlled attachment of PV panels with dummy panels and a backplane to create a PV assembly. PV panels may themselves be laminated to each other with laminating thermoplastic material as well as other adhesion materials. These thermoplastic materials or other adhesion materials may be used, instead of the mechanical connectors of a backplane as well as with mechanical connectors of a backplane, to mechanically secure PV panels and dummy panels to each other and/or to one or more backplanes. In some embodiments, assembly may comprise having the panels laid up on the backplane and electrically interconnected to a backplane. This PV assembly may then be laminated together to fully seal it. Embodiments may employ curing or non-curing sealants (butyl tape or RTV silicone or similar) for purposes of holding PV panels to each other, to hold PV panels to dummy panels and/or to hold backplanes to either or both.

As noted above, embodiments may further employ module level power electronics (MLPEs) such as microinverters. These MLPEs may be integrated into panel/backplane combinations, and other configurations as well. Pre-assembly may serve to improve performance and avoid in-field DC wiring. For locations where module level shutdown is not a requirement or based on some interpretations of NEC code, j-boxes may be employed for purposes of reducing subassembly costs.

Features of embodiments may comprise offsets of PV panels to mimic roof tiles; staggered PV panel edges, which can be maintained until installation and may be used for interconnection of assemblies into full PV arrays on the roof; dummy panels that may be inserted and locked into place to give a uniform look; connections for j-boxes options; and backplanes with connection features to support power output size ranges from 100 W to 500 W or more.

In embodiments, front materials of PV assemblies (e.g., backplane and one or more PV panel) may include glass or polymeric surfaces, while back materials of PV assemblies may be glass, fiberglass reinforced plastic (FRP), metal, shingle material, back sheet, or laminating adhesive, which may be used as an encapsulant. Metal may also be employed in assemblies to help impart flame/burning brand resistance. Backplane materials, which PV panels may be attached to, can comprise FRP, glass, or other rigid or semi-rigid material. In embodiments, a PV panel's size can vary from single cell small panels to nine, twelve or more PV cells and produce various aggregate wattages including 12 W, 24 W, 36 W, 72 W, etc. Other output wattages and PV cell numbers may be employed as well, including fewer PV cells such that 201 avoidance may be provided.

Electrical interconnection between assemblies or PV panels may be configured such that dummy panels leave interconnection areas accessible. In embodiments, dummy panels can snap in place or be otherwise attached and positioned to cover electrical interconnections, junction boxes, and/or microinverters w/ interconnections. During assembly or afterwards, embodiments may include a removable panel that, when removed, would expose connections of an underlying backplane. These exposed connections may then be used for electrical connection to a microinverter or other MLPE for the assembly or an entire array. The microinverter or other MLPE may be attached in factory or field installed.

The panels may be mounted onto a backplane using various materials and techniques. These can include RTV/Adhesive, mechanical connectors, spray adhesive, foam, asphalt strips as well as others. The assemblies, which may be considered laminates, may be attached to a roof with various materials and techniques that may include: standard roofing fasteners, spray adhesive, butyl, and/or screw+butyl. Groups of assemblies may be considered a PV array. Embodiments may include backplanes comprising encapsulants EVA Ethylene-vinyl acetate, POE polyolefin, TPU thermoplastic polyurethane, Ionomer, conducting ribbons, tin coated Cu. Backplanes may also comprise roofing material or have roofing material backing such as fiber reinforced materials and glass. Thus, embodiments may comprise laminated and nonlaminated backplane compositions.

Also, embodiments may provide for a flexible backplane that covers electrical connecting ribbons, or other electrical wires, but allows for soldering and sealing around the ribbons or wires. These ribbons or wires may be attached to simple electrical connectors that can be plugged directly into the backplane. Spade connectors or other electrical connectors may provide for controlled electrical attachment of PV panels to the backplane to form a PV assembly.

When using a laminating thermoplastic material as a backplane, the PV panels may be laid up on the backplane and electrically interconnected to the backplane. The PV assembly may then be laminated together to fully seal the assembly. The sealing in this embodiment and others may be a curing or non-curing sealant (butyl tape or RTV silicone or similar) and the MLPE, such as a microinverter may be integrated to give specified performance and reduce or eliminate in field DC wiring connections within an assembly. J-boxes may also be employed when allowable by applicable electrical codes.

Embodiments may comprise a modular photovoltaic system including a plurality of discrete photovoltaic panels in which each of the panels may comprise a photovoltaic cell and a backplane, the backplane comprising a plurality of exposed electrical connectors, the electrical connectors positioned to electrically couple with at least one photovoltaic panel of the plurality of panels, and the backplane may further comprise a first wire, the first wire electrically connected to at least one of the exposed electrical connectors and the backplane may be positioned underneath one or more of the panels. In embodiments, the electrical connectors may be a via and the backplane may be a laminate. A dummy panel may also be included, the dummy panel may lack PV cells and may be mechanically coupled to the backplane or to one or more photovoltaic panels or both. A panel sealing flap may also be included. This flap may be positioned to overlap each other along at least one side, wherein the panel sealing flap may be positioned at an overlap of panels, and wherein the sealing flap may comprise a flexible area, the flexible area devoid of PV cells and the flexible area possibly comprising electrical ribbon connectors. Also, the backplane may have a front planar surface and a back planar surface and the distance between these planar surfaces may not be greater than three inches. The backplane may also comprise a second wire and a third wire, where each of these two wires may be connected to at least one of the exposed electrical connectors. Also, the exposed electrical connector in embodiments may be a press fit connector providing mechanical securement and electrical connection when a panel mates with the connector and they are in an engaged position.

Embodiments may also comprise a plurality of discrete photovoltaic panels, each of the panels comprising a photovoltaic cell, each of the panels shingled over or below at least one other panel of the plurality; a first discrete backplane, the first backplane comprising a plurality of electrical panel connection wires, wherein the panels are electrically connected to at least one wire of the plurality of electrical panel connection wires, wherein the panels are mechanically connected to the first backplane. In some embodiments, the first backplane may further comprise one or more electrical vias, the one or more vias providing electrical contact access to at least one ribbon of the plurality of electrical panel connection ribbons, and wherein the panels each comprise a connector flap, the connector flap overhanging an externally accessible panel electrical connector. In some embodiments, the first backplane may be a laminate and may comprise an exposed mounting surface upon which the panels are mechanically connected. In some embodiments, the panels may be electrically connected to the wire through one or more vias present in the first backplane. In some embodiments, a second discrete backplane may be used, the second backplane comprising a plurality of electrical panel connection wires, the second backplane electrically connected to the first backplane, the first backplane and the second backplane each comprising a first material. In some embodiments, a panel of the plurality may be mechanically connected to the first backplane and the second backplane and wherein a fill material may be positioned between a panel of the plurality and the first backplane.

In some embodiments, a plurality of discrete photovoltaic panels, each of the panels comprising a photovoltaic cell may be used. Here, a laminate backplane may comprise a plurality of electrical wires, the laminate backplane comprising a plurality of electrical connection points on a first side of the laminate backplane, wherein each panel of the plurality of panels is electrically connected to a wire of the plurality of electrical wires. Also, the electrical connection points may be accessible through one or more vias in the backplane. And, each panel may comprise a sealing flap, wherein the panels may be positioned along the backplane and may overlap each other along at least one panel side, and wherein the panel sealing flap may be positioned at each overlap of panels. In some embodiments, the backplane may also comprise a plurality of mechanical connectors, the mechanical connectors configured to mechanically couple with at least one panel of the plurality. Still further in embodiments, the electrical wires may comprise ribbons, the ribbons positioned in the laminate backplane beneath one or more of the electrical connection points. Also, embodiments may comprise mechanical connectors positioned in the backplane, the mechanical connectors each mechanically connecting the backplane to a panel of the plurality and sometimes, the backplane may have a planar front surface, the planar front surface comprising at least three mechanical connectors and wherein a first panel may be mechanically connected to at least one of these three mechanical connectors and a second panel may be mechanically connected to at least one of these three mechanical connectors.

FIG. 1A illustrates a plan view of a backplane 110 as may be employed according to some embodiments. This backplane 110, may comprise a homogenous material as well as various materials layered together as a laminate. The homogenous material may include polymers, ceramics, and metals. In embodiments, one of these homogenous materials or others, may also be layered together as a laminate in backplane 110. As can be seen in FIG. 1A, numerous orientations and configurations may exist for the electrical and mechanical connectors and the various electrical pathways between electrical connectors, buses and other electrical components of embodiments.

Figure 1B:
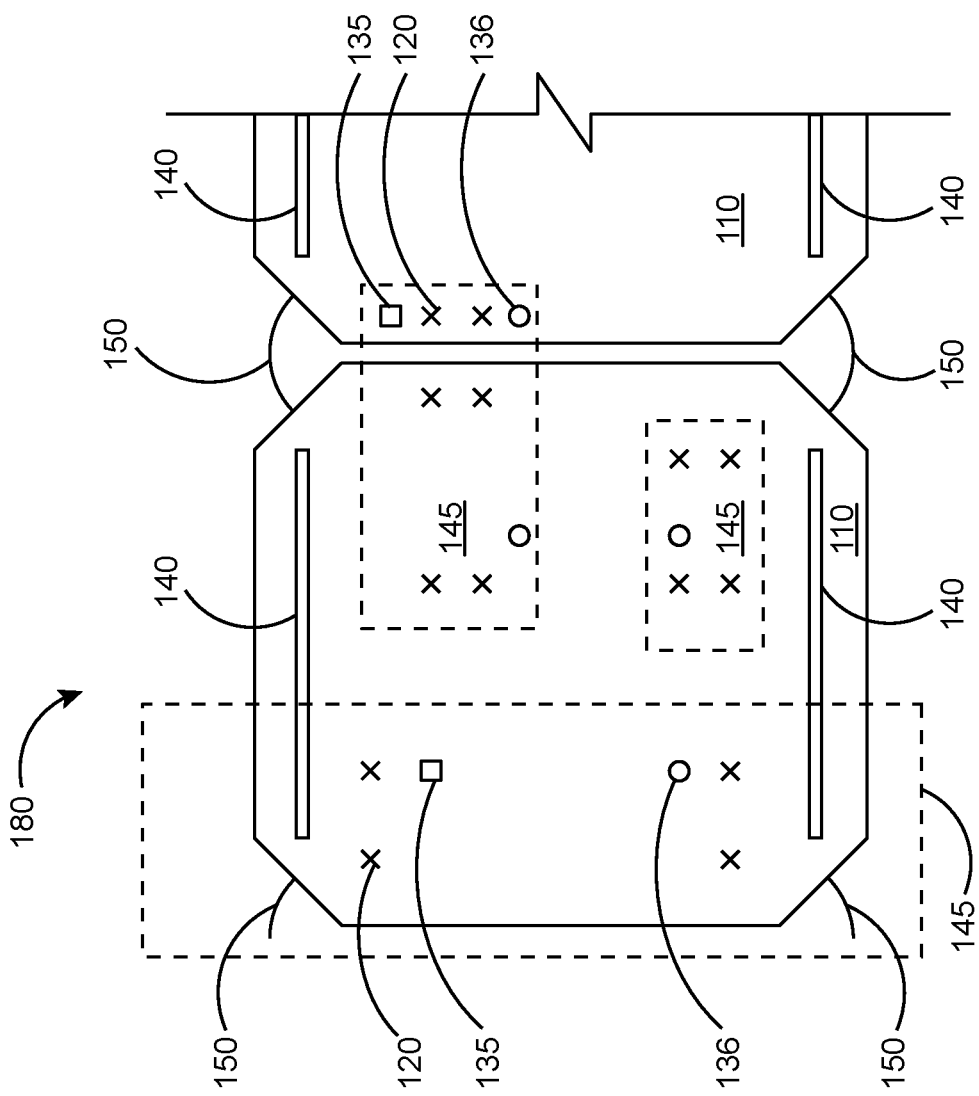
FIG. 1B illustrates a plan view of multiple backplanes and multiple photovoltaic panels, as may be employed according to some embodiments.

As shown in FIG. 1B, backplanes 110 may be connected with one or more PV panels 145 to form a PV assembly 180. These PV assemblies 180 may be aggregated with additional backplanes, additional electrical connections, additional MLPEs, and additional other electrical or mechanical components. As shown in FIG. 1B, PV panels 145 may span backplanes 110, may be completely surrounded by backplanes 110, and may overhang backplanes 110.

Also labelled in FIG. 1A are: mechanical connectors 120; wires 130, which may be ribbon traces, soldered wires, filaments or other electrical pathways; vias 135, exposed electrical connectors 136; electrical bus 140; backplane electrical connector 150; and microinverter 170. The wires 130, or other electrical pathways, may be reachable by exposed electrical connectors 136 as well as by the vias 135. In other words, external electrical connections, through the wires 130, may be made by electrical connections using one or more vias 135 connected to a wire 130 and/or one or more exposed electrical connectors 136 electrically connected to a trace wire. Thus, PV panels designed to be electrically connected to each other may be using the wires 130 and various combinations of vias 135 and/or connectors 136 of backplanes to which the PV panels are connected. Accordingly, electrical pathways, which are labelled as wires 130, may electrically connect exposed electrical connectors 136 with each other and with other components, including any electrical buses 140 and vias 135. These vias 135, may provide surface access to wires 130 of a backplane and may be used to connect PV panels connected to one or more backplane.

In embodiments, mechanical connectors 120 may be configured to serve as securements between a backplane 110 and a PV panel 145 as well as a securement between backplanes or a backplane and a support structure. The mechanical connectors 120 may be configured to provide re-attachable securement as well as permanent securement. Friction fits, snap-type fits, male-female fits, and other mechanical and adhesive connection configurations may be used too as configurations for securement in embodiments.

In use, several PV panels may be attached to mechanical connectors 120 of a backplane 110. These mechanically attached PV panels may then be electrically connected to each other through exposed electrical connectors 136, vias 135 (or both), and intervening wires 130. Electrical backplane connectors 150 can serve to electrically connect adjacent or nearby backplanes to each other. One or more electrical bus 140 may be employed in backplanes of embodiments to aggregate power, for communication, or for other reasons as well. As noted above, the combined backplane 110 and PV panel 140 may be referred to as a PV assembly 180.

FIG. 1B illustrates a plan view of multiple backplanes and multiple photovoltaic panels as may be employed according to some embodiments. As noted above, three PV panels 140 are shown in FIG. 1B. Also shown are one full backplane 110 and a partial backplane 110. As can also be seen in FIG. 1B, PV panels may span backplanes 110 as well as overhang them and or be completely within the perimeter of a backplane. Four mechanical connectors 120 are shown connecting each PV panel 145 to a backplane 110 in FIG. 1B. As can also be seen, the backplanes 110 of FIG. 1A and 1B have different shapes and are different sizes. In embodiments, the shape and size of a backplane may be selected to match the geometry of a final installation location. For example, if the geometry is triangular, the backplane may be triangular and PV panels may be sized and shaped to substantially follow the perimeter edges of the triangular backplane. Likewise, if the final installation location is hexagonal, the backplane may be hexagonal or a plurality of backplanes may be used to form a hexagon and then PV panels may be secured to the one or more backplanes. The backplane electrical connectors 150 are shown electrically connecting two backplanes 110 in FIG. 1B.

Figure 2:
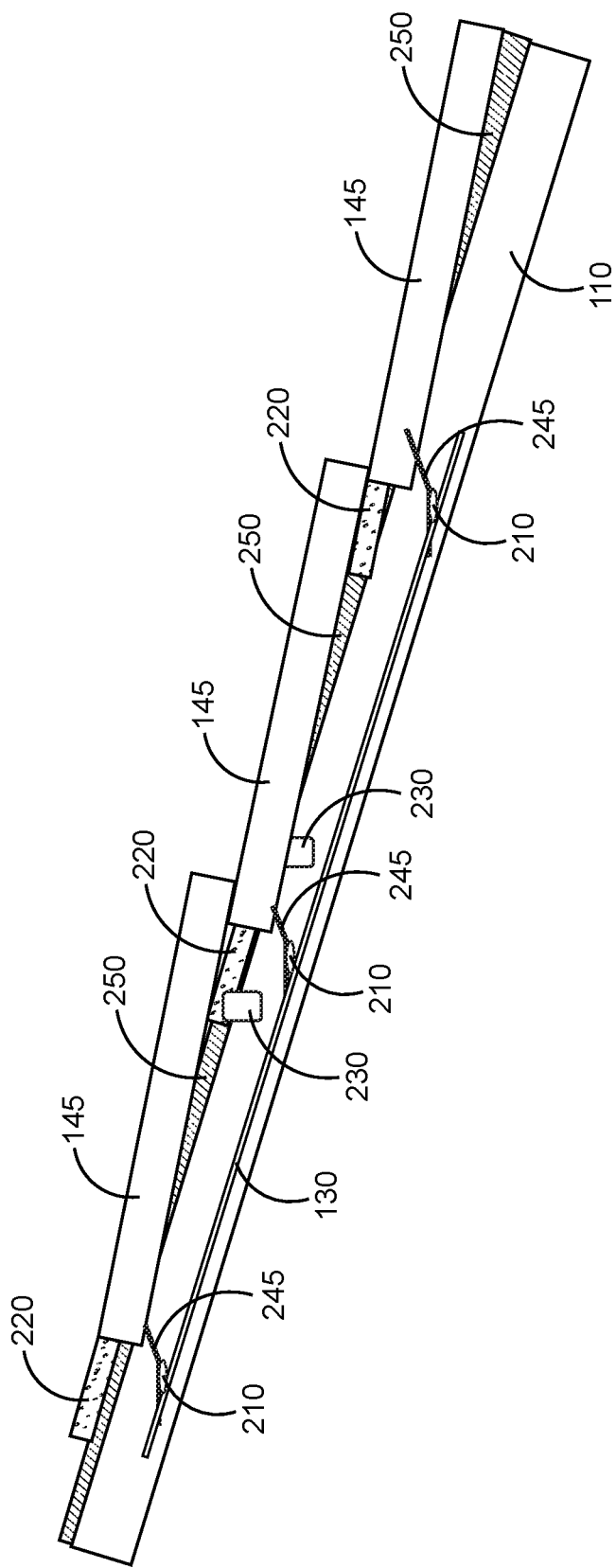
FIG. 2 illustrates a side view of shingled photovoltaic panels mounted on a backplane with solder and flexible cover, as may be employed according to some embodiments.

FIG. 2 illustrates a side view of shingled photovoltaic panels 140 mounted on a backplane 110 as may be employed according to some embodiments. FIG. 2 shows an option that provides for solder connections with a flexible flap 220 as may be employed in embodiments. As can be seen, the folding flap 220 may cover and reach to a panel sealing material 230. This PV panel sealing material 230 may serve to inhibit environmental conditions from reaching ribbon trace wires 245 as well as from reaching between the back of PV panel 145 and the front of backplane 110. The space 250 between the PV panels 140 and the backplane 110 may be filled with sealing foam, plastic, laminating adhesive, or other material. The space 250 may be empty as well. Ribbon trace wires 245, which may be ribbon traces, soldered wires, filaments or other electrical pathways, may be electrically interconnected with wire 130 as well as by larger connections, such as a bus. During assembly, solder may be used to electrically connect each PV panel to ribbon trace wires 245, which can be accessible from a top surface of the backplane. Once soldered, the flaps 220 may be folded onto the backplane and held down with a sealant or other adhesive. Thus, as is shown in FIG. 2, a solder joint may be used to connect a PV panel to embedded ribbon electrical connectors in the backplane. Other connection techniques, such as electrical contact points on a surface of the PV panel and the backplane, as well as electrical connectors on the PV panel and vias in the backplane, may also be used to electrically connect PV panels to the backplane.

Figure 3:
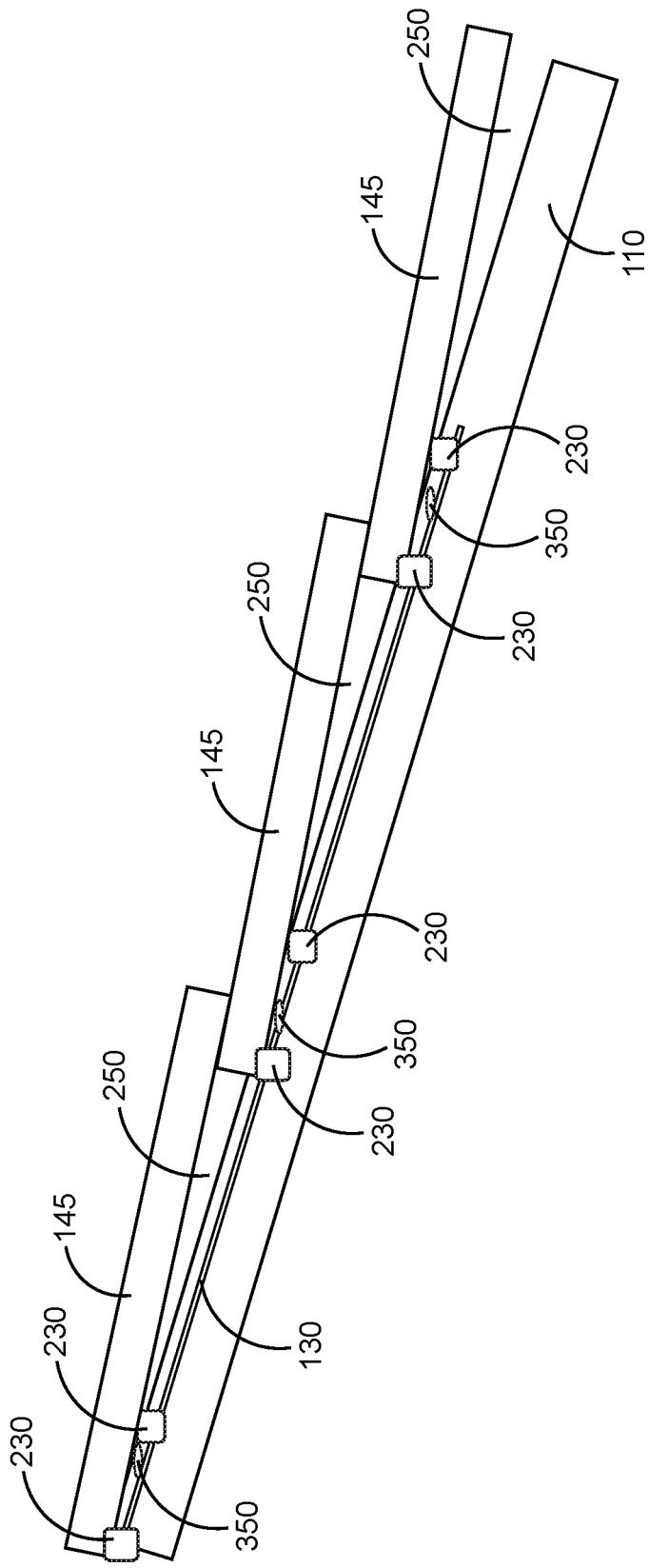
FIG. 3 illustrates a side view of shingled photovoltaic panels mounted on a backplane with press electrical connectors, as may be employed according to some embodiments.

FIG. 3 illustrates a side view of shingled photovoltaic panels 145 mounted on a backplane 110 as may be employed according to some embodiments. FIG. 3 shows an option with button, spade or press-fit type of press electrical connectors 350, as may be employed in embodiments. These press-fit electrical connectors 350 may be positioned and configured to electrically connect with a ribbon trace wire or other electrical pathway of a backplane. The ribbon trace or other electrical pathway may be accessible through a via or may be reached by penetrating through the backplane without a preexisting connection point. Other techniques may also be used for electrical connectors 350. The button or spade or other press-fit configuration of electrical connector 350 may serve to limit or eliminate the need for flaps 220 as shown in FIG. 2. The space 250 may or may not be filled in this and other embodiments. Potting material as well as adhesives and inert foam may each be used in embodiments to partially or completely fill space 250 or other spaces in PV assemblies.

Figure 4:
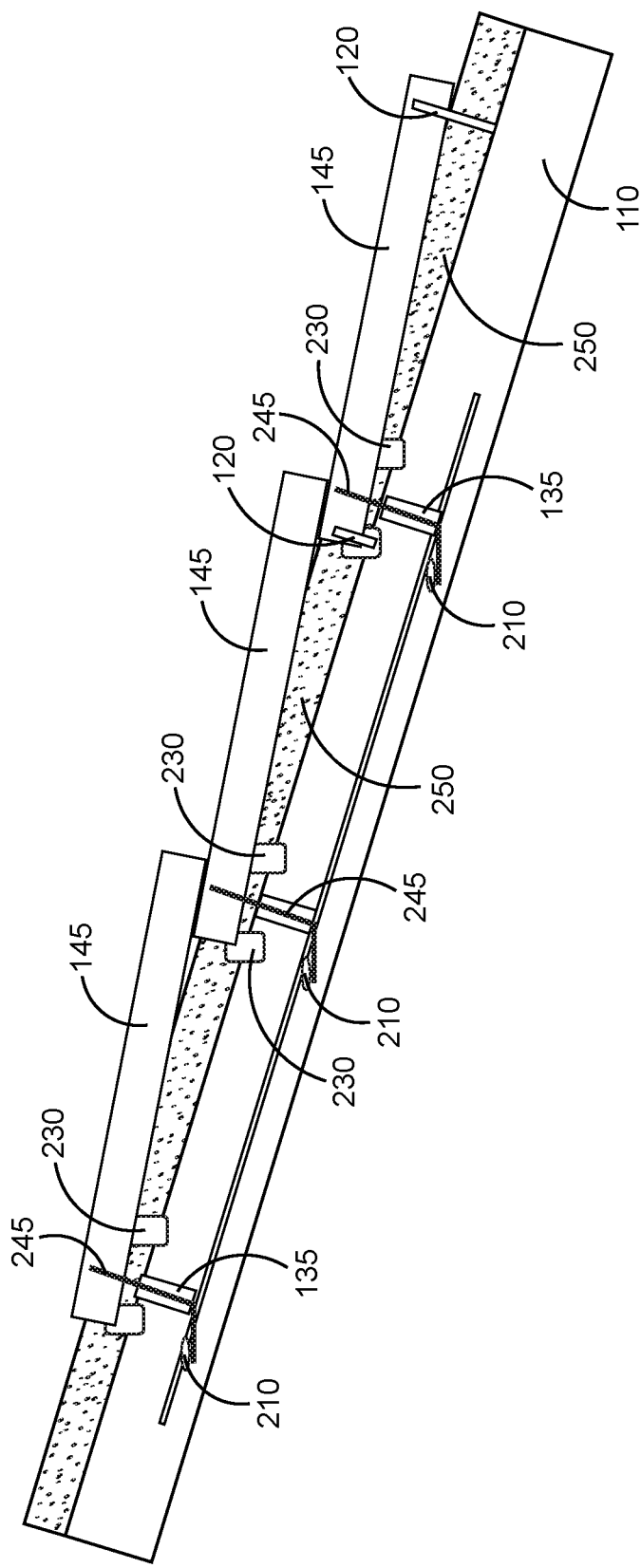
FIG. 4 illustrates a side view of shingled photovoltaic panels mounted on a backplane with solder and flexible covers, as may be employed according to some embodiments.

FIG. 4 illustrates a side view of shingled photovoltaic panels 145 mounted on a backplane 110 as may be employed according to some embodiments. FIG. 4 shows how embodiments may employ ribbon wires 245, which may be passed through the backplane 110, and thereby circumvent a flap to provide sealing as shown in FIG. 3.

Mechanical connectors 120 are shown connecting the third PV panel 145 of FIG. 4 with the backplane 110 or to the panel sealing material 230. This mechanical connector 120 may be positioned during manufacture or later on, closer to installation, when the exact location of each PV panel is confirmed for a specific site by an installer. The vias 135 show how the ribbon trace wires 245 may reach from the PV panels 110, through a via and to the wires 130, which may be ribbon traces. As noted above, the space 250 may be fully or partially filled. This fill may comprise foam, plastic, laminating adhesive, RTV or other material, which may or may not also provide mechanical connection properties between the PV panel and the backplane, in this and other embodiments. The ribbon trace wires 245 may be soldered to the ribbon 136 and, if so, lamination or other sealing techniques may be used to seal the electrical connection. The sealing material 230 in this and other embodiments, may serve to inhibit water or other environmental influences from degrading electrical connections.

Figure 5:
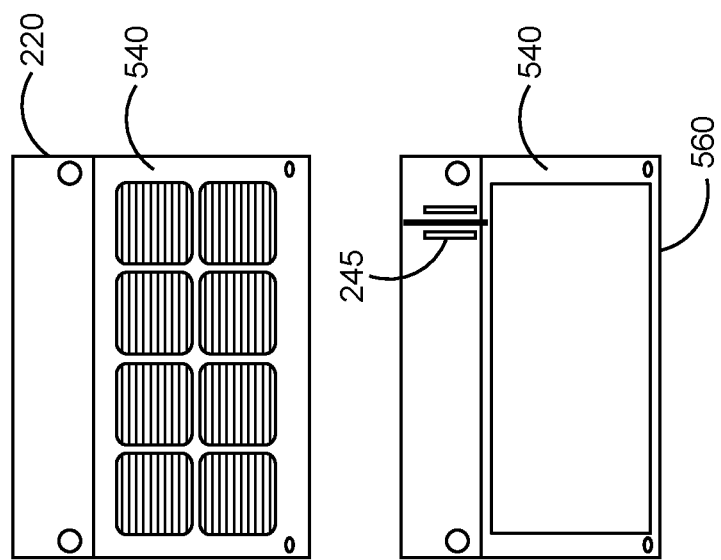
FIG. 5 illustrates a plan view of photovoltaic panels, as may be employed according to some embodiments.
Figure 5:
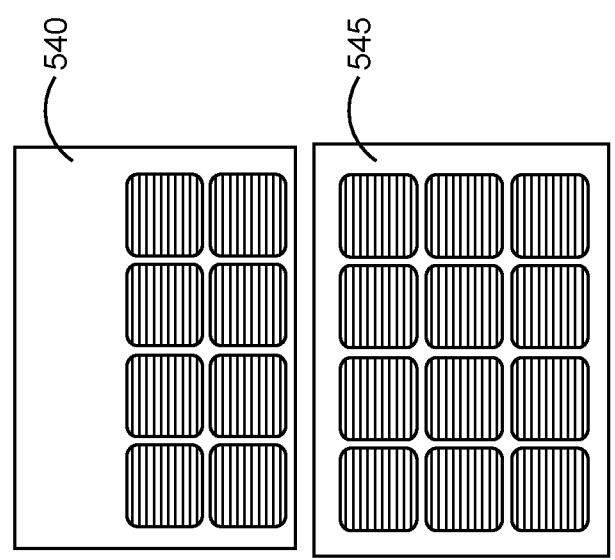

FIG. 5 illustrates a plan view of photovoltaic panels 540 as may be employed according to some embodiments. As can be seen in FIG. 5, a folding flap 220 may be used in conjunction with a PV panel 540. This folding flap 220 may extend past securement points and attachment-ribbon trace wires 245 of the PV panel 540. The wires may emerge from the flexible area surrounded with butyl seal, RTV, or another sealant. These foldable flaps may be present along one side of the PV panel as well as along, two, three, and four sides of the PV panel. These foldable flaps may serve to provide sealing against a mounting surface, such as a backplane or a roof directly or another structure to which the PV panel may be secured. A side of the PV panel may have a perimeter sealant 560, such as Butyl tape. This perimeter sealant 560 may serve to prevent water infiltration behind the PV panel as well as providing structural support for the PV panel and the PV cells which may be on one or both sides of the PV panel. These foldable flaps 220 may also be located on aggregated PV panels. The foldable flaps may be folded up during assembly, to allow for access to electrical connections, and may then be folded down to cover the electrical connections. As is seen in FIG. 5, PV panels of embodiments may have various numbers of PV cells. When small panels are employed, e.g., 1 or 2 PV cells per panel, the number of connectors may necessarily increase in order to make the electrical connections between the small panels.

Figure 6:
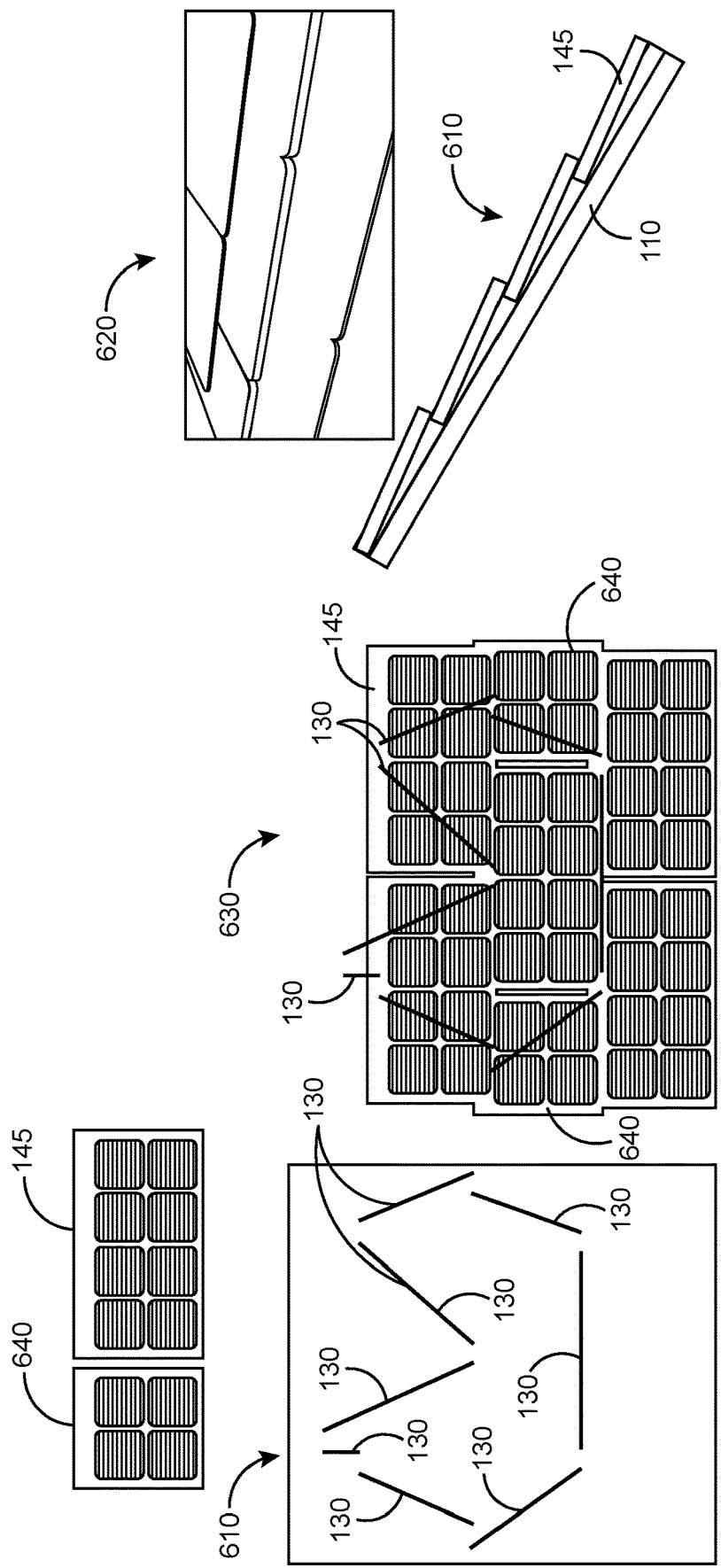
FIG. 6 illustrates a plan view of photovoltaic panels and a backplane, as well as a perspective view of photovoltaic panels and a backplane, and a side view of shingled PV panels and a backplane, as may be employed according to some embodiments.

FIG. 6 illustrates a plan view 630 of photovoltaic panels 145 and a backplane 110, as well as a perspective view 620 of PV panels and a backplane, and a side view 610 of shingled PV panels and a backplane, as may be employed according to some embodiments. As can be seen, in the plan view 610, the wires 130, which may be various kinds of electrical pathway connections, may be located in or on top of a backplane 110. These wires 130 may be positioned to connect with each other and/or PV panels or PV panels that may be connected to the backplane. Two dummy panels 640 are shown behind PV panels 145 in view 630. The wires 130 are also imposed on this view 630.

In this and other embodiments, folding seams may exist in the PV panels as well as in the backplane; and MLPE, such as microinverters, may be incorporated into an assembly. Accordingly, a backplane may be a laminate that is rigid, semi-rigid, flexible or a combination of rigid and flexible portions. Whether a rigid or flexible backplane is selected may depend on the support structure to be used at the installation site, shipping or handling efficiency, manufacturing ease or cost, and so on. For example, direct planar installations may prefer flexible backplanes to allow for better contour matching at the installation site while frame installations may prefer rigid backplanes to more securely secure to supporting frame structures. Backplanes may have various shapes and may have custom configurations. This customization may be provided to accommodate irregular installation shapes and different output demands. As to the irregular shapes, triangles, circles, arcs, etc. for backplanes and PV panels, may be used, to accommodate different installation parameters. As to the output demands, electrical connectors and wires may be sized to accommodate panels of differing outputs, where some connectors have smaller gauges to accommodate lower power outputs of PV panels with fewer PV cells while some connectors may have larger gauges to accommodate PV panels with more PV cells.

Figure 7:
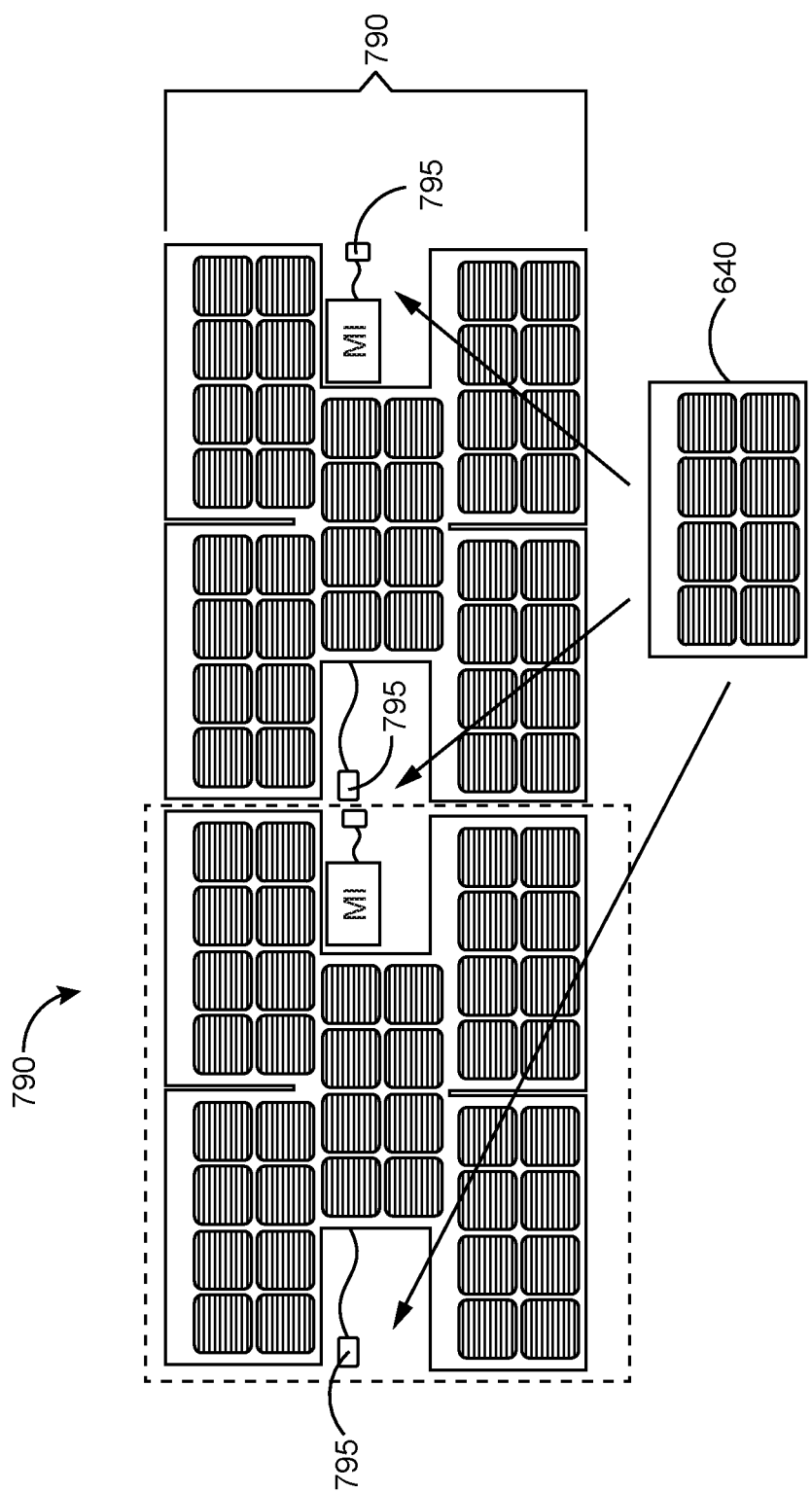
FIG. 7 illustrates a plan view of aggregated photovoltaic panels with dummy panels, as may be employed according to some embodiments.

FIG. 7 illustrates a plan view of aggregated PV assemblies 790, with dummy panels 640, as may be employed according to some embodiments. Also shown in FIG. 7 are power conditioning electronics (e.g., microinverters indicated as "MI") that may service multiple PV panels of an aggregated PV assembly 790 and j-boxes 795 that may be used to make electrical connections among and between PV assemblies 790, PV panels, and other electrical connections. J-boxes, like microinverters, may be integrated into some PV panels, some PV assemblies, some backplanes, and not others in embodiments. As can be seen in FIG. 7, the dummy panels 640 may be positioned over electronics and may have any number of simulated PV cells suitable to blend in with the dummy panel's final location.

Figure 8:
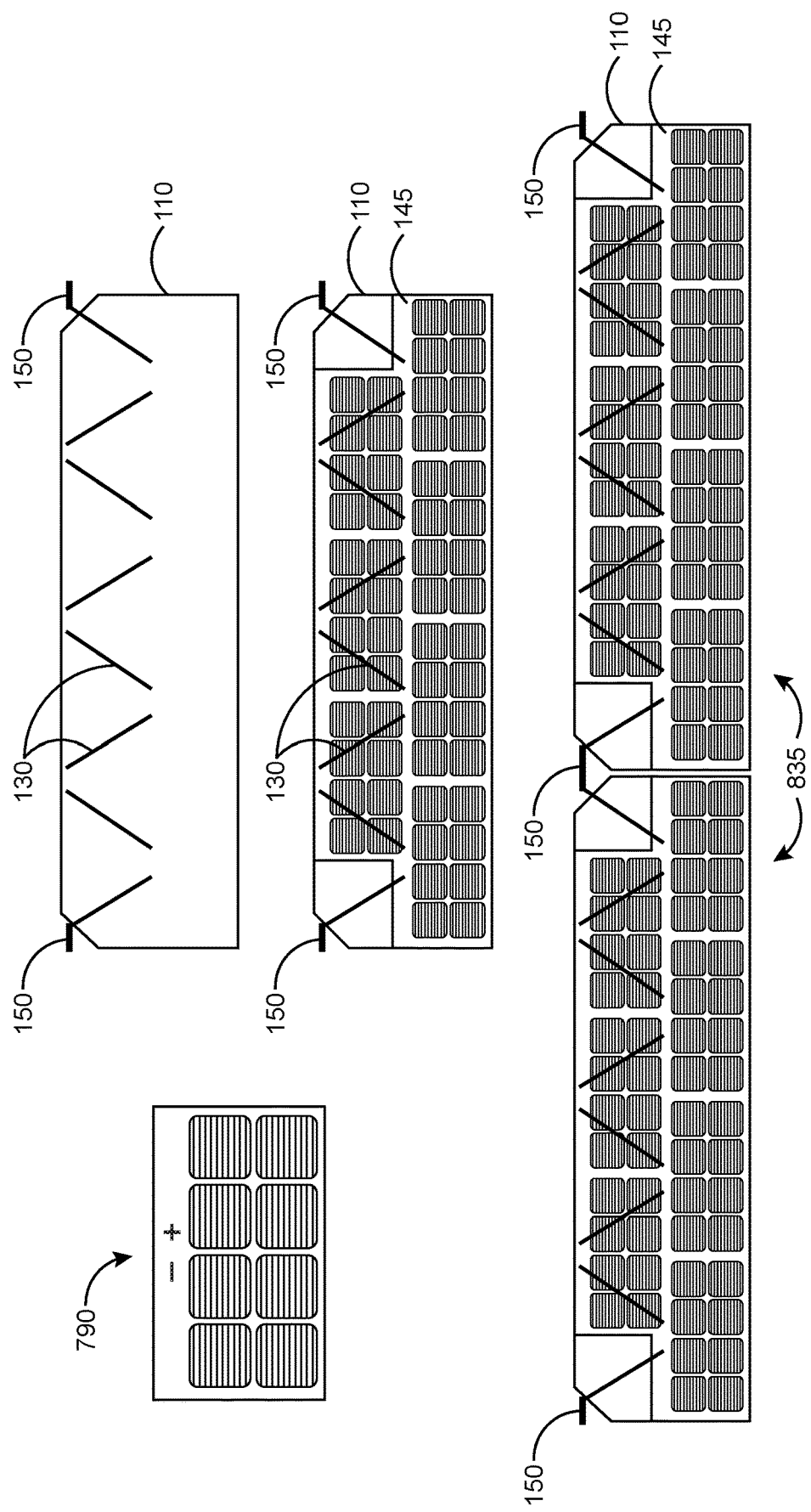
FIG. 8 illustrates a plan view of electrical connectors positioned among and between backplanes and photovoltaic panels, as may be employed according to some embodiments.

FIG. 8 illustrates a plan view of electrical pathway wires 130 positioned among and between backplanes 110 and photovoltaic panels 145 as may be employed according to some embodiments. The backplane connectors 150 may have various configurations. These configurations can include press-fit connectors, snap-fit connectors, bias connectors, soldered connectors, connectors suitable for electrical connection during manufacture and electrical connectors suitable for connection during installation. Thus, some embodiments may include electrical connectors and mechanical connectors suitable for connection during manufacture while other electrical connectors and mechanical connectors may be suitable for connection near the time of installation and some electrical and mechanical connectors may be suitable for both connection times. Also labelled in FIG. 8 are the backplane cutout 865 and assembly 790. An orientation in which adjacent assemblies may be connected is shown at 835 of FIG. 8.

Figure 9:
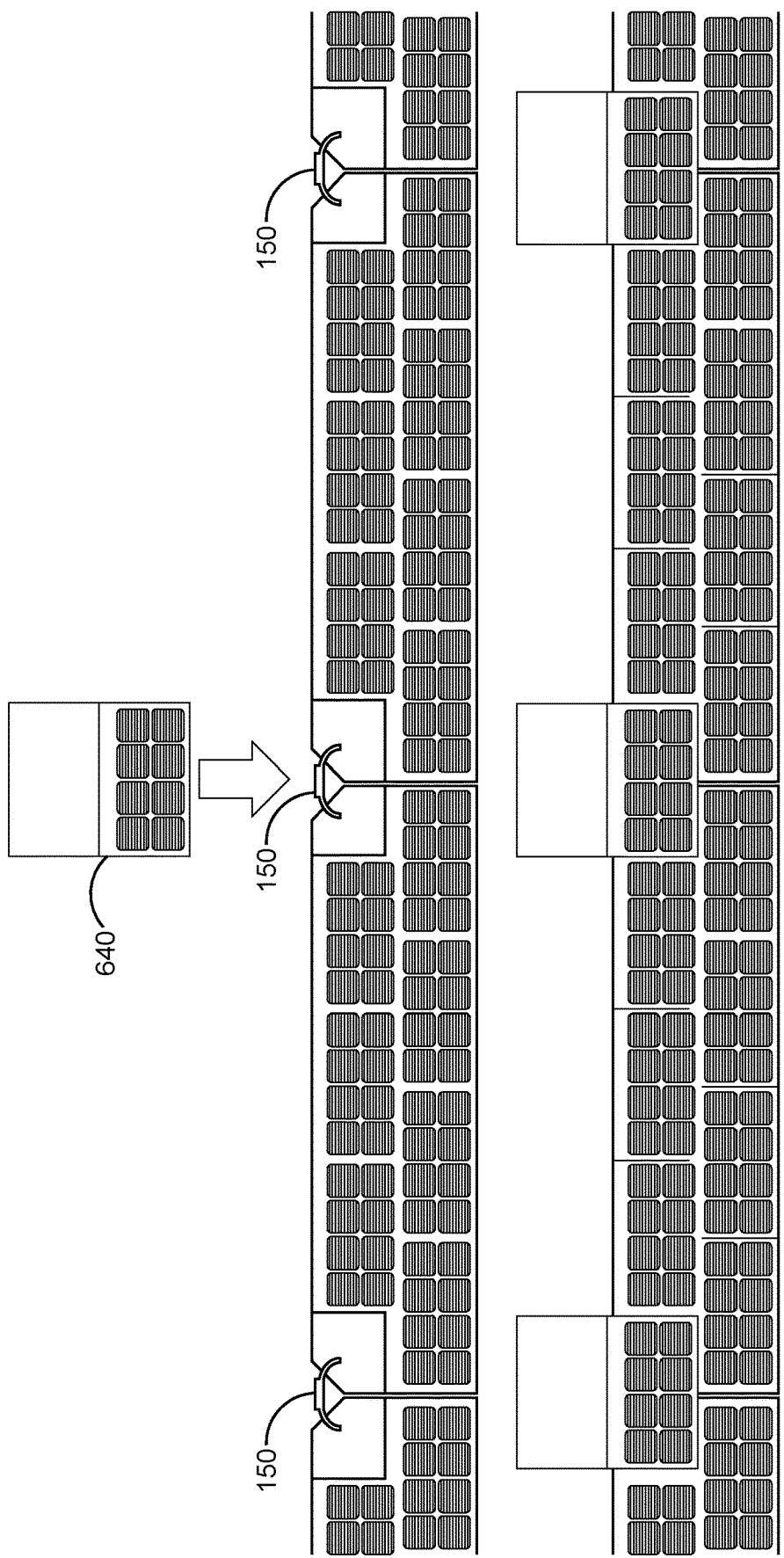
FIG. 9 illustrates a plan view of dummy panels as well as electrical connectors positioned among and between backplanes and photovoltaic panels according to some embodiments.

FIG. 9 illustrates a plan view of dummy panels 640 as well as electrical panel connectors 150 positioned among and between backplanes and photovoltaic panels according to some embodiments. FIG. 9 shows how a dummy panel may be used to cover a connection between strings of PV panels. The dummy panels 640 are shown with upper flashing, which may be inserted over connections and may serve to seal gaps between PV assemblies nearby.

Figure 10:
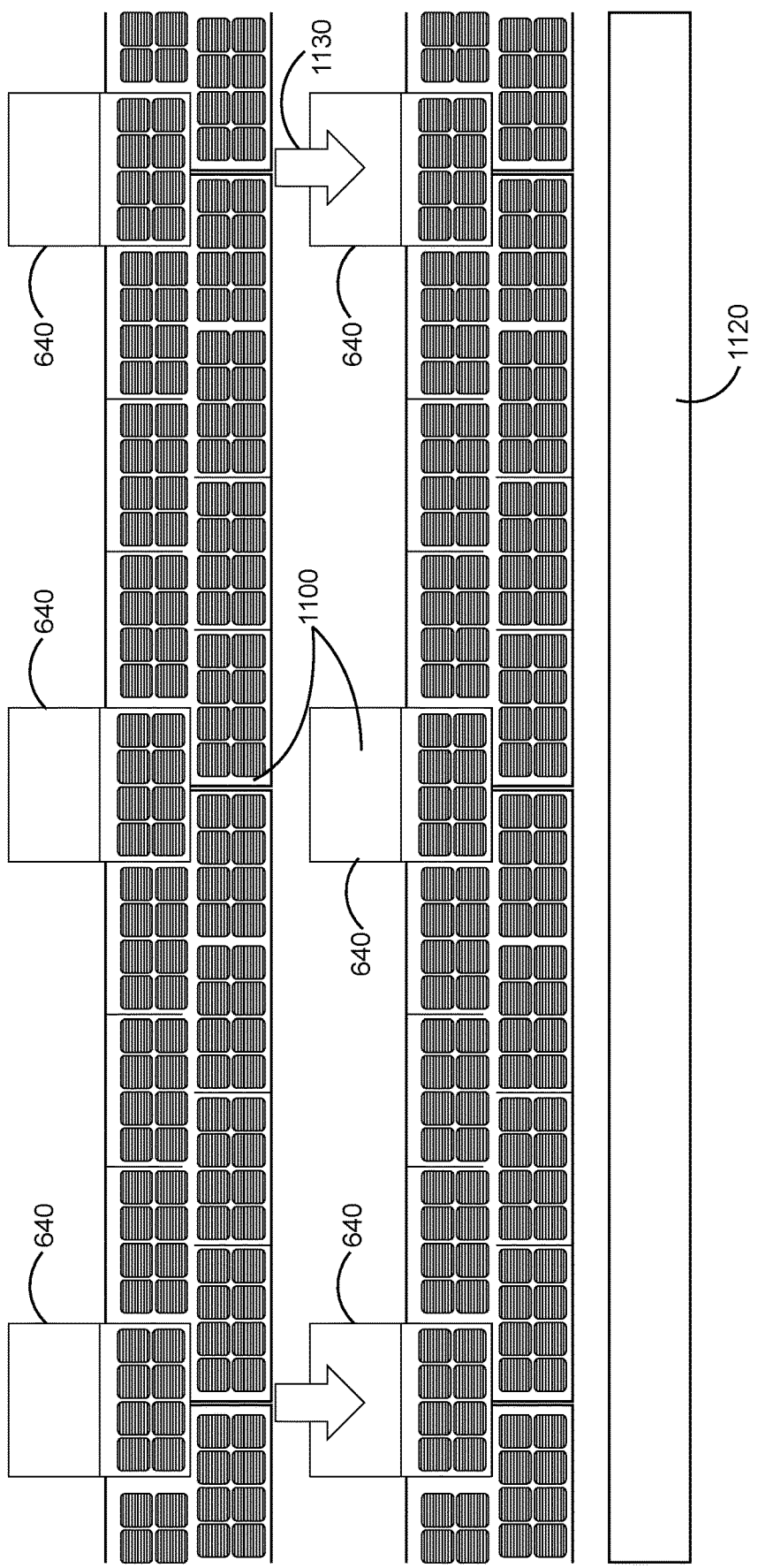
FIG. 10 illustrates a plan view of dummy panels, as may be employed among and between backplanes and photovoltaic panels, according to some embodiments.

FIG. 10 illustrates a plan view of dummy panels 640 as may be employed among and between backplanes and photovoltaic panels according to some embodiments. A sealing strip 1120 is also shown as well as an arrow 1130, which designates a direction of movement during assembly. As noted on FIG. 10, a sealing strip 1120 may be installed first, before PV assemblies are installed, during a roof installation. The gaps 1100 may be flashed by dummy panels in embodiments.

Figure 11:
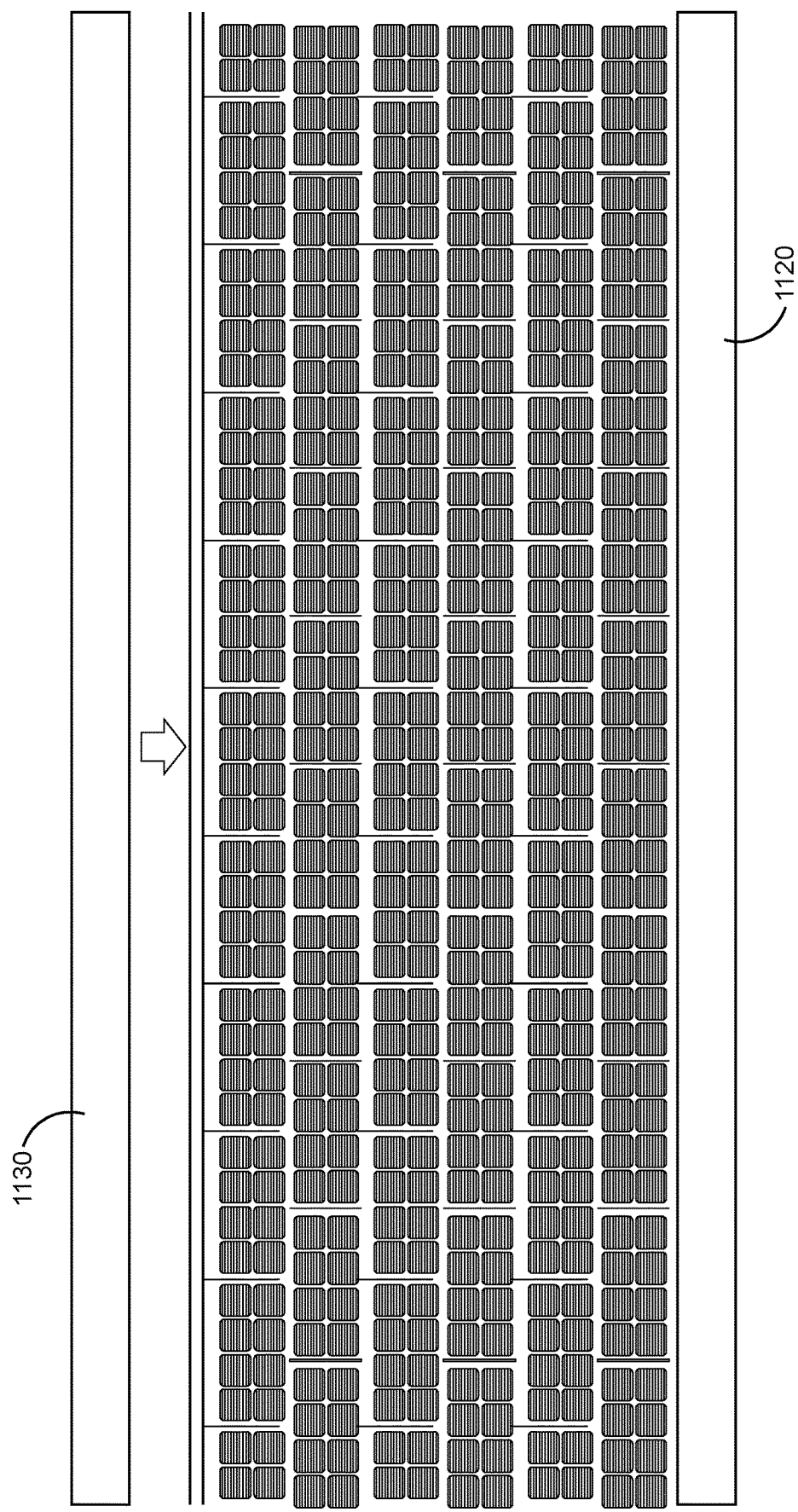
FIG. 11 illustrates a plan view of a dummy panel, flashing, and a sealing strip, as may be employed among and between backplanes and photovoltaic panels, according to some embodiments.

FIG. 11 illustrates a plan view of dummy panels 640, flashing 1130, and a sealing strip 1120 as may be employed among and between backplanes and photovoltaic panels according to some embodiments. As can be seen in FIG. 11, a finished roof installation may include assemblies adjacent to each other and may employ dummy panels covering outfacing portions of the PV assemblies. The leading and lagging edges of the installation may include flashing 1130 and sealing 1120, respectively.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A modular photovoltaic system comprising:
a plurality of discrete photovoltaic panels, each of the panels comprising a plurality of photovoltaic cells, each of the panels of the plurality having a light-passing top surface, and each of the panels of the plurality having an outwardly facing panel perimeter;
a discrete solid laminate backplane comprising a plurality of discrete mechanical connectors and a plurality of discrete electrical connectors, the laminate backplane also comprising a plurality of discrete electrical connection points on a first side of the laminate backplane, the laminate backplane further comprising two or more layers adhesively connected to one another to form the solid laminate,
wherein each panel of the plurality of panels is electrically and mechanically connected to an electrical connector of the plurality of electrical connectors,
wherein the panels of the plurality of panels are configured to be secured to the backplane via at least one mechanical connector from the plurality of mechanical connectors, the plurality of mechanical connectors securing the panels of the plurality of panels with a spacing between a bottom planar surface of the panels of the plurality of panels and a top planar surface of the backplane, the mechanical connector being one or more of a snap-fit type connector, or a friction-only type connector, or a male-female connector, or a hook and loop connector, and
wherein the spacing varies in height between the bottom surface of the panels of the plurality of panels and the top surface of the backplane.

2. The system of claim 1 wherein the electrical connection points are accessible through one or more vias in the backplane.

3. The system of claim 1 wherein each panel comprises a sealing flap, wherein the panels are positioned along the backplane and overlap each other along at least one panel side, and wherein the panel sealing flap is positioned at each overlap of panels.

4. The system of claim 1 wherein the plurality of electrical connectors comprise ribbons, the ribbons embedded in the laminate backplane beneath one or more of the electrical connection points.

5. The system of claim 1 wherein the backplane has a planar front surface, the planar front surface comprising at least three mechanical connectors from the plurality of mechanical connectors and wherein a first panel is mechanically connected to at least one of these three mechanical connectors and a second panel is mechanically connected to at least one of these three mechanical connectors.

6. A modular photovoltaic system comprising:
a plurality of discrete photovoltaic panels, each of the panels comprising a plurality of photovoltaic cells, each of the panels of the plurality having a light-passing top surface, and each of the panels of the plurality having an outwardly facing panel perimeter;
a discrete solid laminate backplane comprising a plurality of discrete mechanical connectors and a plurality of discrete electrical connectors, the laminate backplane also comprising a plurality of discrete electrical connection points on a first side of the laminate backplane, the laminate backplane further comprising two or more layers adhesively connected to one another to form the solid laminate,
wherein each panel of the plurality of panels is electrically and mechanically connected to an electrical connector of the plurality of electrical connectors,
wherein the panels of the plurality of panels are configured to be secured to the backplane via at least one mechanical connector from the plurality of mechanical connectors, the plurality of mechanical connectors securing the panels of the plurality of panels with a spacing between a bottom planar surface of the panels of the plurality of panels and a top planar surface of the backplane, the mechanical connector being one or more of a snap-fit type connector, or a friction-only type connector, or a male-female connector, or a hook and loop connector,
wherein mechanical connectors from the plurality of mechanical connectors are positioned in the backplane, the mechanical connectors from the plurality of mechanical connectors each mechanically connecting the backplane to a panel of the plurality of panels, and wherein the spacing between the bottom surface of the panels of the plurality of panels and the top surface of the backplane has a triangular cross-section.

7. The system of claim 6 wherein the electrical connection points are accessible through one or more vias in the backplane.

8. The system of claim 6 wherein each panel comprises a sealing flap, wherein the panels are positioned along the backplane and overlap each other along at least one panel side, and wherein the panel sealing flap is positioned at each overlap of panels.

9. The system of claim 6 wherein the plurality of electrical connectors comprise ribbons, the ribbons embedded in the laminate backplane beneath one or more of the electrical connection points.

* * * * *